No. 608,313. Patented Aug. 2, 1898.
G. L. ALLEN.
MACHINE FOR MAKING MUD GUARDS FOR BICYCLES.
(Application filed June 17, 1897.)
(No Model.) 6 Sheets—Sheet 2.
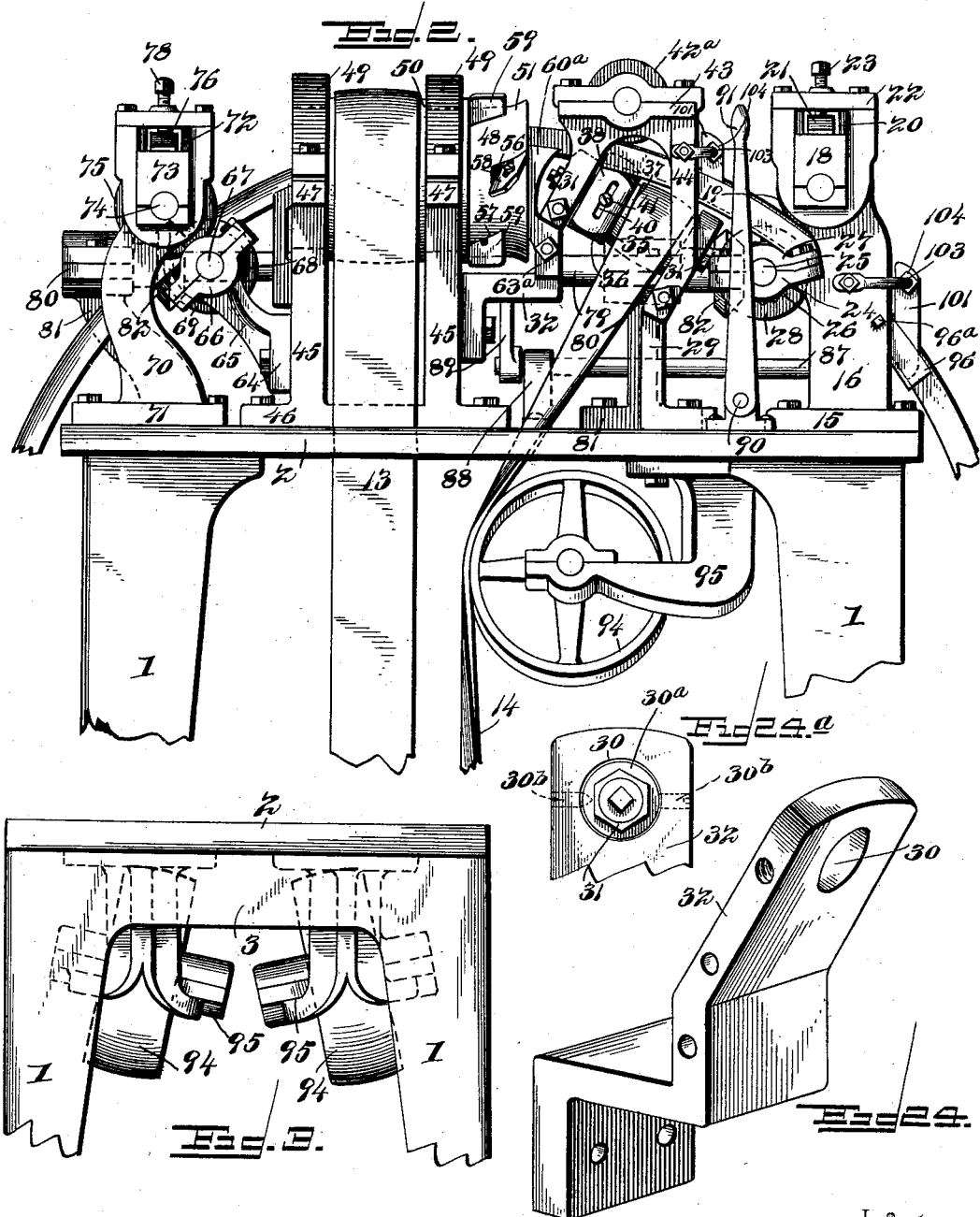
Witnesses
E. F. Stewart.
Edwin Cruse.
Inventor
George L. Allen
By his Attorneys,
C. A. Snow & Co.

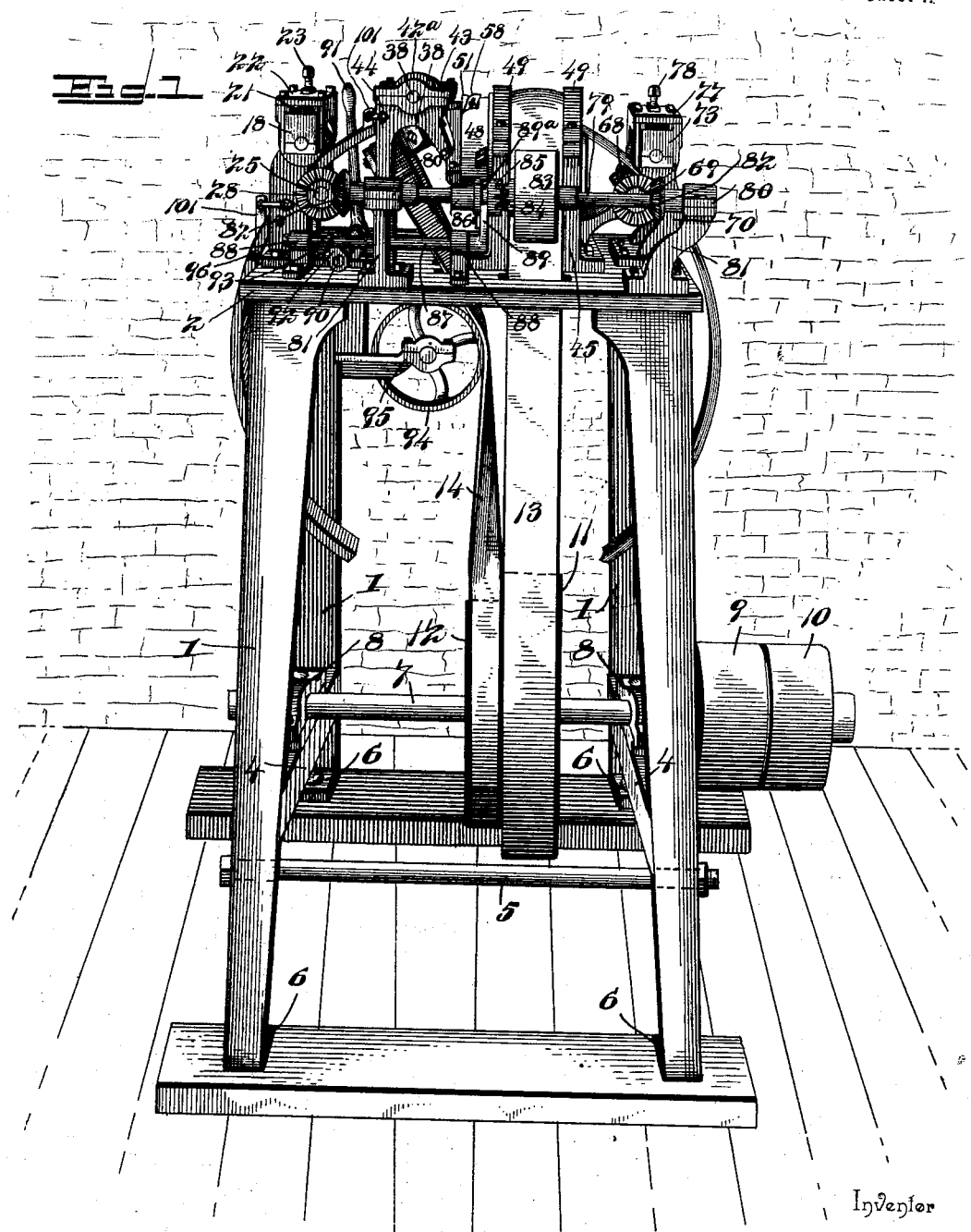

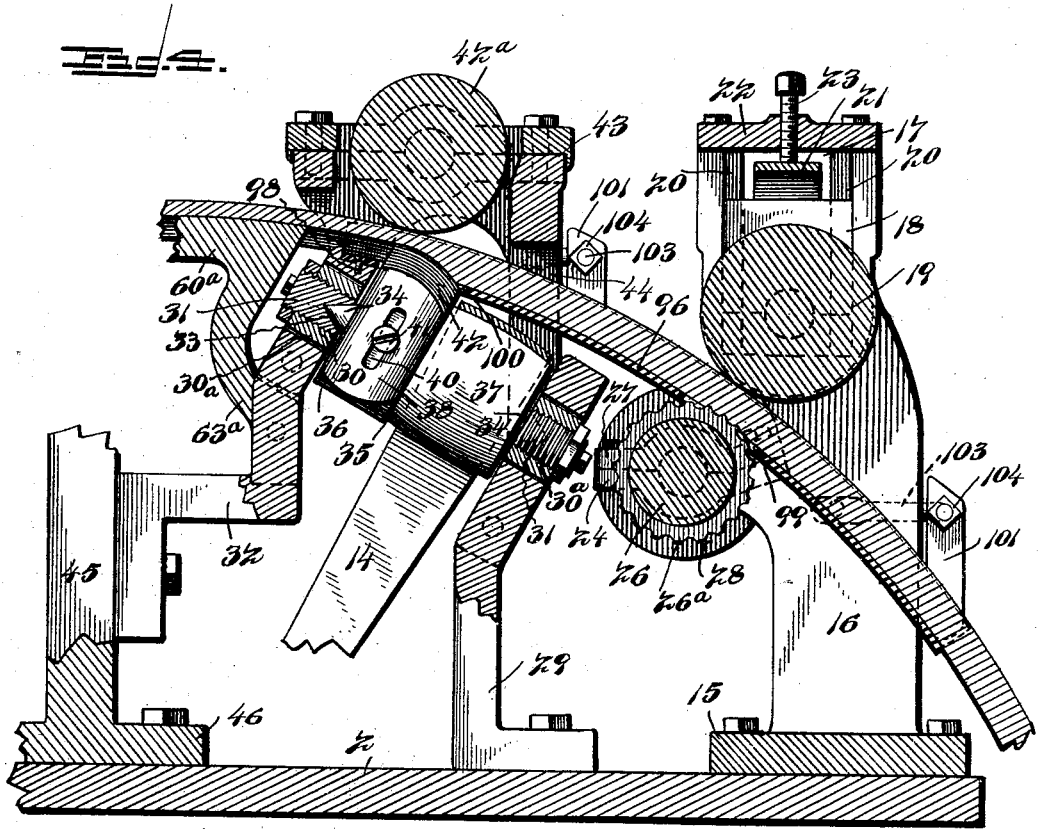

No. 608,313. Patented Aug. 2, 1898.
G. L. ALLEN.
MACHINE FOR MAKING MUD GUARDS FOR BICYCLES.
(Application filed June 17, 1897.)
(No Model.) 6 Sheets—Sheet 4.
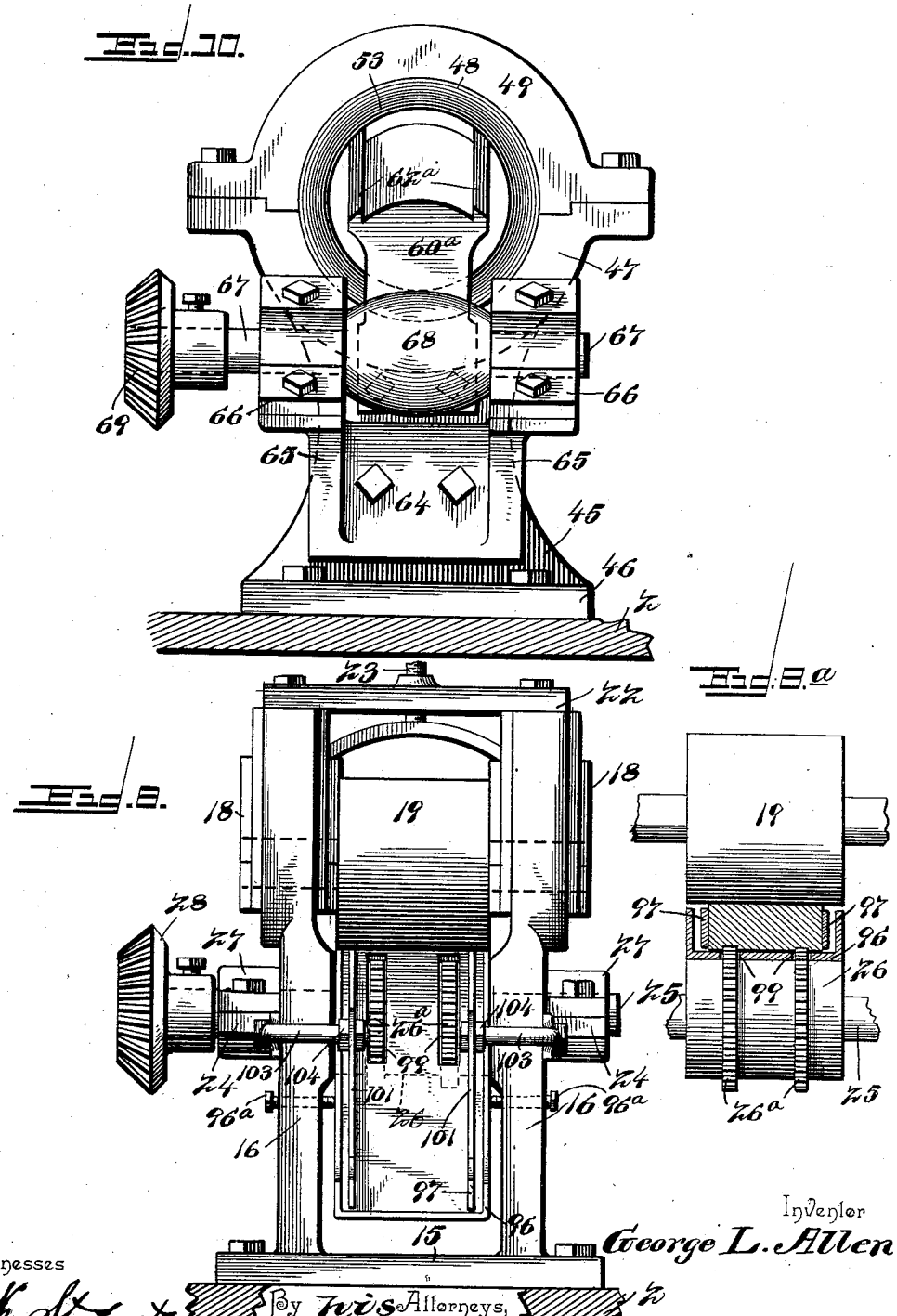

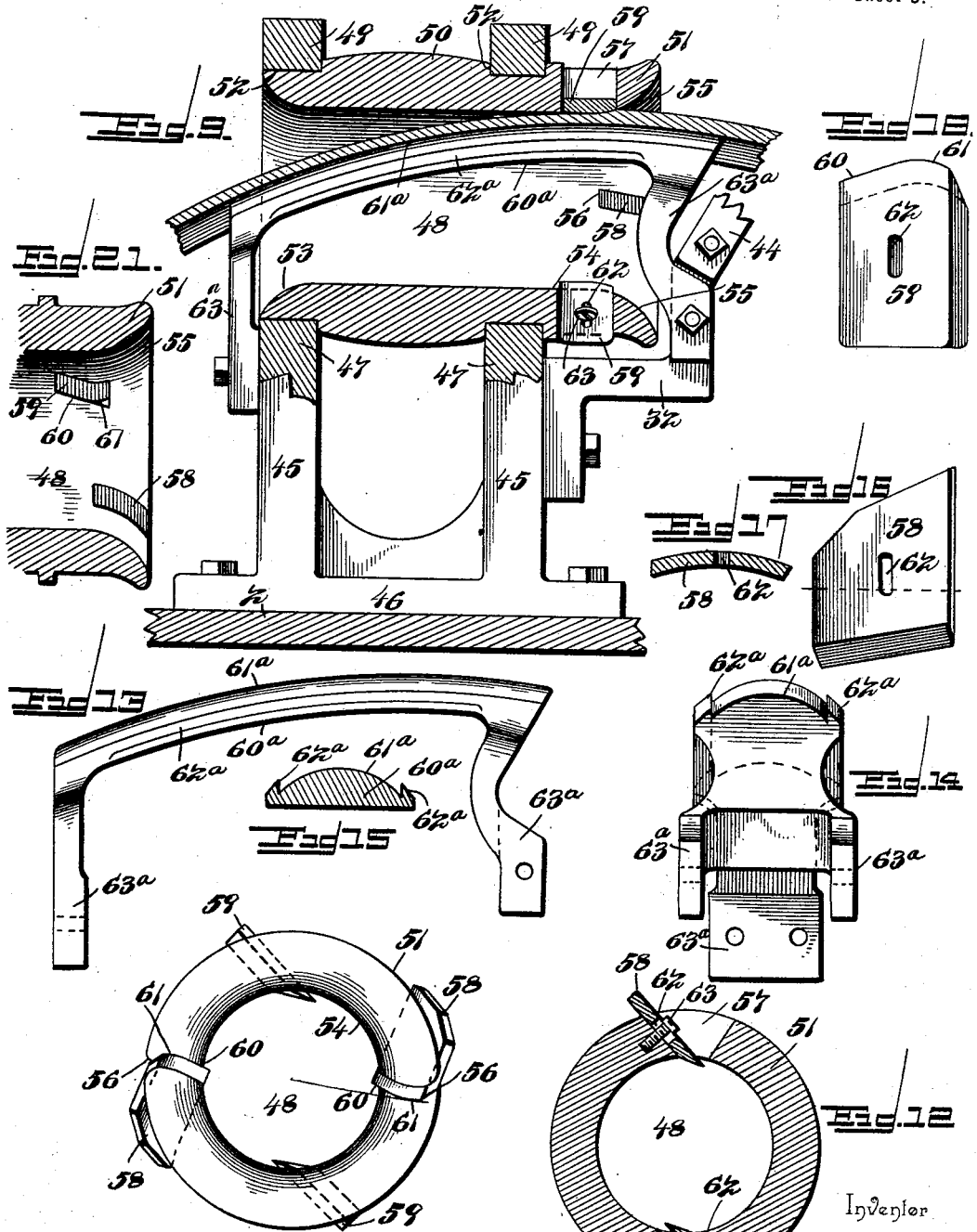

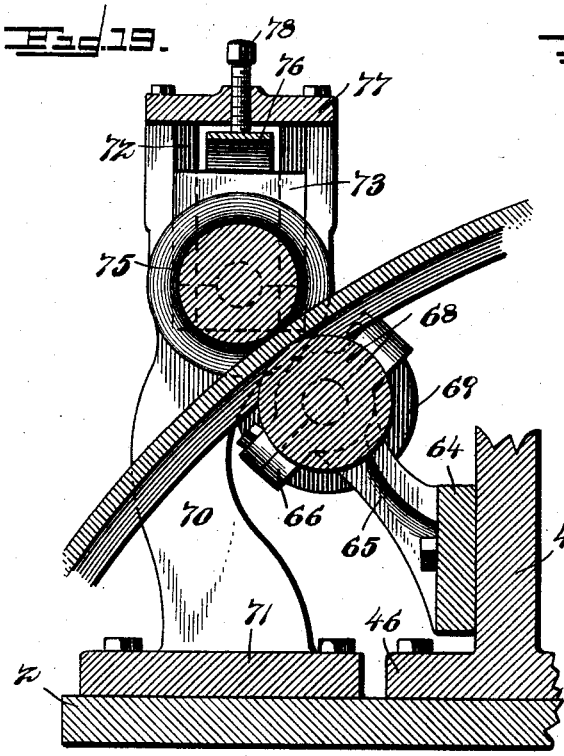
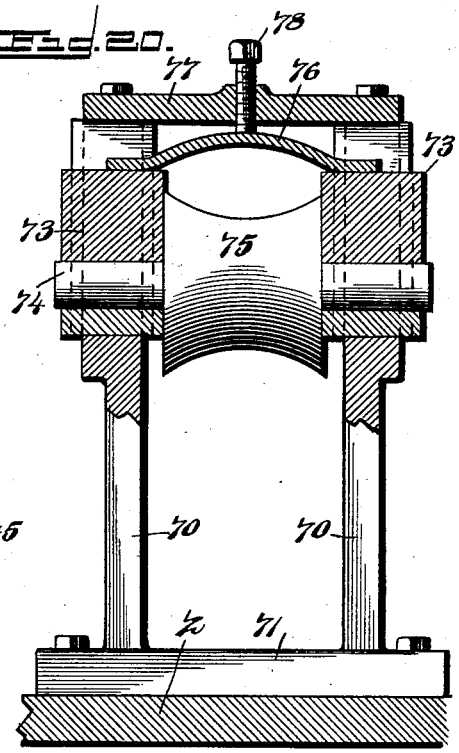
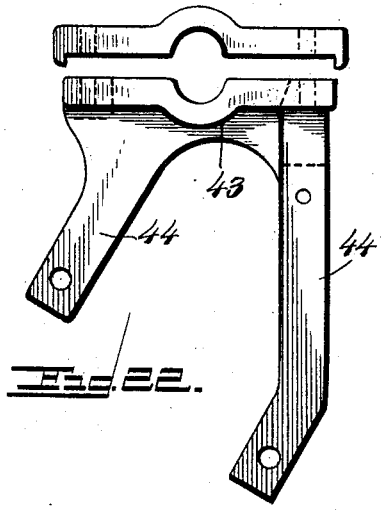
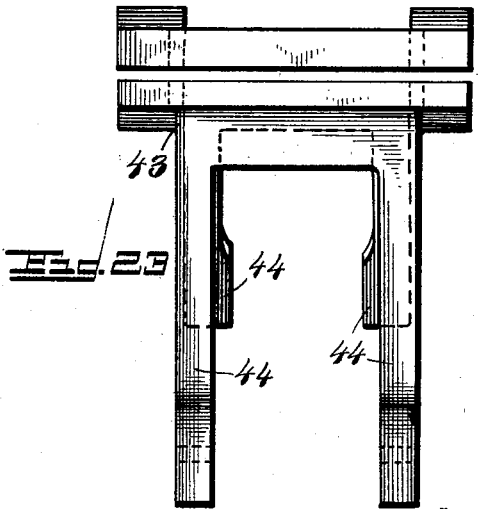

UNITED STATES PATENT OFFICE.

GEORGE L. ALLEN, OF BRADFORD, PENNSYLVANIA.

MACHINE FOR MAKING MUD-GUARDS FOR BICYCLES.

SPECIFICATION forming part of Letters Patent No. 608,313, dated August 2, 1898.

Application filed June 17, 1897. Serial No. 641,165. (No model.)

*To all whom it may concern:*

Be it known that I, GEORGE L. ALLEN, a citizen of the United States, residing at Bradford, in the county of McKean and State of Pennsylvania, have invented a new and useful Machine for Making Mud-Guards for Bicycles, of which the following is a specification.

This invention relates to machines for making bicycle mud-guards or other like articles having a similar outline, its object being to provide a machine of this character which shall cut the wood across the grain in shaping the blank to the required form in such manner that the concavity and convexity of the opposite faces shall be true arcs of circles.

With this object in view the invention consists of two rotating cutters arranged one in advance of the other to cut across the grain of the wood on opposite sides thereof, the first cutter being adapted to cut the inner concave face of the mud-guard or similar article and the other the convex outer face.

The invention further consists in the novel construction and arrangement of the feeding and supporting devices for the blank and in the novel construction and arrangement of the driving mechanism for the several parts of the operating mechanism.

The invention will be fully described hereinafter and then particularly pointed out in the claims.

In the drawings, Figure 1 is a perspective view of the machine. Fig. 2 is an elevation of the upper part of the machine, looking at the side opposite to that shown in Fig. 1. Fig. 3 is an end view of the upper part of the stand. Fig. 4 is an enlarged sectional view of the feed-rolls and the first cutter. Figs. 5 and 6 are sectional views of the head and knives of the first cutter. Fig. 7 is an elevation of one of the knives detached. Fig. 8 is a detail end view of the front feed-rolls. Fig. 8ª is a similar view, the blank and its supporting-plate and guide being in section and the frame omitted. Fig. 9 is a longitudinal section through the second cutter and the supporting-plate for the blank. Fig. 10 is a rear end view of the second cutter and the supporting-plate. Fig. 11 is a front end view of the second cutter. Fig. 12 is a sectional view of the second cutter through the inner knives. Fig. 13 is a side elevation of the supporting-plate. Fig. 14 is a front end view of the supporting-plate. Fig. 15 is a vertical transverse section through the same. Fig. 16 is an elevation of one of the outer knives in the second cutter. Fig. 17 is a transverse section of Fig. 16. Fig. 18 is a perspective view of one of the inner knives of the second cutter. Fig. 19 is a sectional view of the rear feed-rolls. Fig. 20 is a sectional end view of Fig. 19. Fig. 21 is a horizontal section of the second cutter-head. Figs. 22, 23, 24, 24ª, and 25 are detail views of some of the supporting-brackets detached.

Similar reference-numerals indicate similar parts in the several figures.

The frame of the machine consists of the legs 1, which support at their upper ends a plate 2, on which the operating parts of the machine are supported. The two legs at each end of the machine are connected together at their upper and lower ends by cross-bars 3 and 4, preferably cast integral with the legs, and the opposite legs of each pair are connected together by the tie-rods 5. Each leg is provided with a foot 6, adapted to be bolted to the floor or other suitable base-support. 7 represents the main driving-shaft, journaled in bearings 8, firmly secured to the cross-bars 4. On one side of the machine the shaft carries the usual fast and loose pulleys 9 and 10 for the main driving-belt. (Not shown.) On the shaft 7, intermediate its bearings, two pulleys 11 and 12 are mounted to turn with the shaft. The pulley 11 is larger than the pulley 12 and drives the belt 13, which in turn drives the second cutter, while the pulley 11 drives the belt 14, which in turn drives the first cutter.

At one end of the plate 2 a bar 15 is secured, from which bar two standards 16 extend upwardly. The upper ends of these standards are recessed, as indicated at 17, to receive the bearings 18 of the spindle of an idle-roll 19. The bearings 18 have a vertical sliding movement on the guides 20, and the ends of a bowed plate-spring 21 rest upon the bearings 17. A cap-plate 22 is bolted to the upper ends of the standards, and a set-screw 23 works in said plate and engages the spring 21 to regulate its pressure on the bearings 17. From each standard 16, about midway its length, projects a half-bearing 24 for the shaft 25 of the feed-roll 26, which is provided with spaced peripheral toothed flanges 26ª intermediate its ends. The other halves 27 of the bearings are bolted to the halves 24 in the usual manner. One end of the shaft projects beyond its bearing and carries a beveled gear 28, which is keyed or otherwise securely locked to the shaft. Immediately in front of the feed-roll 26 an angle-bracket 29 is bolted to the plate 2 and is provided at its upper end with an opening 30, in which a disk 30ª, of less diameter than the opening, is pivoted on the conical ends of threaded pins 30ᵇ, which work in suitable openings leading into the openings 30 from the opposite sides of the bracket. The disk 30ª is provided with a central threaded opening to receive an exteriorly-threaded bearing-block 31 of hardened steel. Another angle-bracket 32 is bolted at its lower end to a standard 45, to be hereinafter referred to, and is provided with an opening 30, on which a disk 30ª is pivotally mounted and provided with a central threaded opening for a bearing-block 31, all being similar to those in the bracket 29.

Each of the blocks 31 is provided with a conical recess 33 to receive the conical journals 34 of the cutter 35. This cutter, for the sake of distinction, will be called the "first" cutter. It consists of the cutter-head 36 and the pulley 37, integral with each other. The cutter-head is provided with opposite bearing-faces for the knives, which faces flare outwardly from the pulley to the end of the head and are slightly curved, as indicated at 39 in Fig. 6, to correspond with the transverse curvature of the knives 38. The inner faces of the knives are straight longitudinally, as are the bearing-faces of the head in the corresponding direction. Each knife is provided with an elongated slot 40, through which a set-screw 41 passes into the head to provide an adjustable connection between the knife and the head. The knives are provided with rounded cutting edges, as indicated at 42. The angle-brackets 29 and 32 are so shaped and arranged that the cutter 35 is supported in an oblique position, with the cutter-head higher than the pulley. Owing to their peculiar form and arrangement the knives will therefore make a cut directly across the grain of the wood at a right angle to the movement of the blank; but such cut is oblique or slanting outward from its deepest point to the surface of the blank, as clearly shown in Fig. 4. By having the bearing-blocks 31 pivotally supported in the brackets on an axis at a right angle to the axis of the cutter-head they will at all times be in perfect alinement with the cutter-head, and thereby prevent undue friction on the journals of the latter.

Immediately above the cutter 35 an idle-roll 42ª is journaled in bearings 43, and from the lower half of the bearings arms 44 project downwardly and are bolted to the edges of the angle-brackets 29 and 32. This roll serves as a firm support for the blank against the outward thrust of the cutter 35 while making the concave in the under face of the blank.

45 indicates standards extending up from a base-plate 46, with which they are integral, and this plate 46 is firmly bolted to the plate 2. The upper ends of the standards form the lower halves 47 of bearings for the second cutter 48. The upper halves 49 of these bearings are bolted to the lower halves in the usual manner. The cutter 48 consists of a tubular pulley 50 and cutter-head 51, integral with each other. At each end of the pulley annular recesses 52 are formed, which receive the bearings 47 and 49, and the pulley is thereby securely held against endwise movement, but may turn freely in the bearings. The cylindrical bore of the pulley will preferably have a diameter equal to the diameter of the circle on which the convex face of the mud-guard is to be turned. This will usually be three inches; but it is obvious that it may be more or less, if preferred. The rear end of the pulley-bore is flared outwardly, as shown at 53.

The inner end 54 of the bore of the cutter-head is of the same diameter as that of the pulley for about an inch, or more or less, as desired, and the bore then begins to flare outwardly on a curved line, as indicated by 55. Four recesses are formed in the cutter-head equidistantly, two of which are indicated by 56 and the other two by 57. The recesses 56 are diametrically opposite each other, as are the recesses 57, and the former are at the outer end of the head, while the latter are at the inner end thereof. Knives 58 are secured in the recesses 56, which knives are gouge-shaped or curved in cross-section, as clearly shown in Fig. 17, and the convexity of the rear face of the knife is substantially equal to the convexity of the flaring outer end of the cutter-head, and the face of the recess against which the knife is seated is correspondingly concaved. The knives 59, which are secured in the recesses 57, are flat and their edge is straight for about three-fourths the width of the knife, as indicated at 60, and the remaining portion 61 is rounded. The straight portion 60 of the edge is to be equal in length to the straight portion of the bore of the head, and the curvature of the rounded portion 61 will correspond with the convexity of the flaring portion through which it projects. Each of the knives 58 and 59 is provided with an elongated slot 62, through which a set-screw 63 passes into the cutter-head to provide an adjustable connection between the knife and the head. The recesses are so formed that each of the knives will make an oblique or drawing cut transversely of the grain of the blank, and the cut of each knife will start at its outer corner. The path of travel of the knives 58 overlaps that of the knives 59, as is clearly indicated in Fig 9.

60ª represents a supporting-plate which is curved longitudinally to correspond substantially with the longitudinal curvature of the mud-guard being made. The plate is also convex on its upper face, as indicated at 61ª, and is provided with upwardly-extending side flanges 62ª. The convexity of the plate 60ª is of the same curvature as the concave inner face of the guard, which has been cut by the first cutter. The blank passes directly from the first cutter onto the plate 60ª, and this plate extends through the second cutter 48 and forms a firm bed, on which the blank fits snugly and is supported while the second cutter forms the outer convex face of the guard. The flanges 62ª are spaced apart a distance substantially equal to the width of the blank, and the latter can therefore have no lateral movement while being cut by the knives of the second cutter. The plate 60ª is provided at each end with a downwardly-extending arm 63ª, the rear arm being bolted to the rear standard 45 and the front arm being bifurcated to straddle the bracket 32, to which it is securely bolted.

When the cutter 48 is rotated, the outer knives 58 cut off the upper corners of the blank and the knives 59 complete the shaping of the blank to the desired convexity.

64 represents a bar or plate firmly bolted to the rear standard 45, and from this plate project rearwardly and upwardly spaced arms 65, which carry at their upper ends bearings 66 for the spindle 67 of a roll 68. The periphery of the roll 68 is convex to correspond with the concave inner face of the mud-guard with which it is designed to engage. The spindle 67 extends beyond its bearing at one end and carries a beveled gear 69, which is keyed or otherwise firmly secured to the shaft to turn therewith.

70 represents vertical standards connected at their lower ends by a plate 71, which is integral with the standards and is bolted to the plate 2 just in advance of the standards 45. The upper ends of these standards 70 are recessed, as indicated at 72, to receive the bearings 73 of the spindle 74, which carries the roller 75. The bearing 73 is adapted to have a limited vertical movement in the recesses 72, and they are engaged by the ends of the bowed plate-spring 76. A cap 77 is secured to the upper ends of the standards, and a set-screw 78 works in this cap to engage the spring 76 to adjust its pressure on the bearings. The periphery of the roll is concave to fit the convex surface of the mud-guard, and the rolls 68 and 75 receive the mud-guard directly from the second cutter and aid the feed-rolls 26 and 19 in forcing the blank through the machine.

79 indicates a shaft journaled in bearings 80 at the upper end of brackets 81, bolted to the plate 2. This shaft carries at each end a beveled gear 82, which meshes with the bevel-gears 28 and 69, respectively, of the spindles of the feeding-rolls 26 and 68.

83 indicates a pulley which is mounted to turn loosely on the shaft 79, and this pulley carries a clutch member 84. The other clutch member, 85, is carried by a sleeve 86, which is mounted on the shaft 79 to slide thereon and to turn therewith.

87 indicates a bar mounted to slide in bearings 88, which are bolted on the plate 2, and this bar is provided at one end with an upturned bifurcated arm 89, which engages an annular recess 89ª in the sleeve 86.

90 indicates a rock-shaft supported in suitable bearings and provided at one end with a hand-lever 91 and at its other end with a short arm 92, the upper end of which works in a recess 93 in the sliding bar 87. By operating the hand-lever 91 the two clutch-members 84 and 85 can be engaged or disengaged at the will of the operator. The pulley 83 will be driven by means of a belt connected to another pulley on a counter-shaft. (Not shown.) This pulley 83 drives the feeding mechanism, and the feeding mechanism can therefore be stopped at any time without stopping the other parts of the machine.

The belt 13 runs over the pulley 50 of the second cutter, and the belt 14 runs over the pulley 37 of the first cutter, and in order to properly guide this belt idle-pulleys 94 are arranged in the path of travel of the belt 14, and these pulleys serve to twist the belt and also direct it from the pulley 12 to the pulley 37, as clearly shown in Figs. 1, 2, and 3. The pulleys 94 are journaled in suitable brackets 95, secured to the under face of the plate 2, and these pulleys are inclined in opposite directions, as clearly shown in Fig. 3, one of said pulleys engaging the upwardly-moving part of the belt 14 and the other pulley engaging the downwardly-moving part of the belt.

In order to support and guide the blank into the machine, I provide a U-shaped trough 96, curved longitudinally to correspond with the curvature of the blank and of somewhat greater width than the blank in order to receive the spring guide-plates 97, one on each side of the blank. The trough is supported at its forward end upon the upper end of the bracket 32 and is secured thereto by a screw 98. It also rests upon the roll 26 and is provided with two slots 99 in its bottom, through which the toothed flanges 26ª project to engage the blank and feed it forward. The trough 96 is also provided with a slot or opening 100 in its bottom near the forward end, through which the knives 38 work. The trough 96 is held against lateral movement by set-screws 96ª, which work in the standards 16 and engage the ends of the trough.

The spring-plates 97 are each provided with upwardly-projecting arms 101 near their respective ends, and each arm is perforated at its upper end for the passage of the threaded ends 102 of the elbow-rods 103, the other ends of which are bolted to the standards 16 and arms 44, respectively. The arms 101 are firmly and adjustably clamped in position by the nuts 104, which work on the threaded ends of the rods 103, one on each side of the respective arms 101. The trough 96 and the guide-plates 97 will be made of spring sheet-steel and will support and guide the blank in its natural position on its passage to the first cutter.

From the foregoing description the operation of the machine will be readily understood, and it need not, therefore, be specifically described herein. One of the principal advantages arising from the use of my invention is that the concave of the inner face and the convexity of the outer face will be in true arcs of circles, and this irrespective of the condition of the knives. In machines which cut with the grain of the wood the convexity and concavity of the opposite faces depend entirely upon the shape of the cutting edge of the knives, and if the knives are not accurately ground the product will not be uniform in shape.

Many of the mud-guards that are used at the present time are made of bird's-eye maple with the natural finish, and machines with knives which cut the wood in the direction of the grain jar and tear out the eyes, which seriously mars the appearance of the finished article.

Practice has demonstrated that mud-guards may be cut with my machine from bird's-eye maple without any injury whatever to the wood. By cutting transversely of the grain the wood is not nearly as apt to be fractured or split as when cut lengthwise of the grain, and hence I consider my machine a very great improvement over machines which cut the wood longitudinally of the grain.

What I claim is—

1. In a machine for cutting bicycle mud-guards or other like articles, the combination of two rotating cutters arranged to operate successively on opposite sides of the blank to cut the wood transversely of the direction of the feed, one of said cutters rotating on an axis substantially parallel with the grain of the blank and forming a concave face on the blank and the other cutter being tubular and forming a convex face on the blank, and devices to support the blank and feed it to the cutters, substantially as described.

2. In a machine for cutting bicycle mud-guards or other like articles, the combination of two rotating cutters one of which is tubular, said cutters being arranged to operate successively on opposite sides of the blank with their cutting edges obliquely disposed to cut the wood transversely of the grain of the blank with a draw cut, one of said cutters forming a concave and the other a convex face on the blank, and devices to support the blank and feed it to the cutters, substantially as described.

3. In a machine for cutting bicycle mud-guards or other like articles, the combination of two rotating cutters mounted one in advance of the other and adapted to operate successively on opposite sides of the blank, the first cutter rotating on an axis substantially parallel with the grain of the blank and forming the inner concave face, and the second cutter being tubular and forming the outer convex face, and both cutters cutting transversely and obliquely of the grain of the wood, and devices to support the blank and feed it to the cutter, substantially as described.

4. A cutter-head having opposite bearing-faces for the knives and means to secure the knives to the head, combined with a pulley formed integral with the head, a conical journal at the outer end of the head, and a conical journal at the outer end of the pulley, said journals being integral with the head and pulley, respectively, and bearing-blocks pivotally supported on an axis at a right angle to the axis of the said journals, and having conical openings to receive said journals, substantially as described.

5. In a machine for cutting bicycle mud-guards or other like articles, a rotating tubular cutter-head, knives mounted in said head to cut the blank transversely of the grain, to form the outer convex face on the blank, and a longitudinally-curved plate extending through the cutter to support the blank within the cutter, and devices to feed it therethrough to be operated on by the cutter-knives, substantially as described.

6. In a machine for forming a longitudinally-curved blank into cross-sectionally concavo-convex shape, a rotating tubular cutter through which the blank is fed, and which forms the convex face, a longitudinally-curved plate extending through the said cutter to support the blank, and a cutter rotating on an axis substantially parallel with the grain of the blank, to form the opposite convex face, the cutting edges being disposed to cut transversely of the grain of the blank, substantially as described.

7. In a machine for making bicycle mud-guards, or other like articles, a rotating tubular cutter to form the outer convex face on the blank, said cutter having a hollow cutter-head, a hollow pulley integral therewith, and annular recesses at each end of the pulley which form journals to fit in the bearings for the cutter, combined with a longitudinally-curved plate extending through the cutter to support the blank, substantially as described.

8. In a machine for making bicycle mud-guards, or other like articles, a hollow rotating cutter to form the outer convex face on the blank, said cutter having a head provided with a central bore the inner portion of which is straight and the outer portion outwardly flaring, a series of knives supported in the head to project into the straight portion of the bore, and a series of knives supported in the head to project into the flaring portion of the bore, combined with a longitudinally-curved plate extending through the cutter to support the blank, substantially as described.

9. In a machine for making bicycle mudguards, or other like articles, a hollow rotating cutter to form the outer convex face on the blank, said cutter having a head provided with a central bore the inner portion of which is straight and the outer portion outwardly flaring, a series of knives supported in the head to project into the straight portion of the bore on a line oblique to the axial line of the cutter, and a series of knives supported in the head to project into the flaring portion of the bore also obliquely to the axis of the cutter, combined with a longitudinally-curved plate extending through the cutter to support the blank, substantially as described.

10. In a machine for making bicycle mudguards, or other like articles, the combination with a hollow rotating cutter to form the outer convex face on the blank, of a longitudinally-curved supporting-plate extending through said hollow cutter to support the blank in a position to be operated upon by the cutter, substantially as described.

11. In a machine for forming bicycle mudguards or other like articles from longitudinally-curved blanks, a rotating cutter supported immediately beneath the line of feed of the blank and rotating in a plane transversely across said line of feed, the cutting edges being disposed obliquely to cut with a draw cut and form a concave face in the work, combined with a curved supporting-plate in advance of the cutter, and a presser-roll disposed on the vertical plane of the cutter-head and coacting with said cutter-head and with the supporting-plate to present the work in proper relation to the cutter-head, substantially as described.

12. In a machine for making bicycle mudguards, or other like articles, the combination with a rotating cutter mounted below the blank to cut the concave face on the blank, of a hollow rotating cutter in advance of the first cutter to cut the outer convex face on the blank, and a longitudinally-curved support extending through the hollow cutter to support the blank to be operated upon by the hollow cutter, the bearing-face of said support being convex in cross-section to correspond with the concave face of the blank formed by the first cutter, substantially as described.

13. In a machine for making bicycle mudguards, or other like articles, the combination with a rotating cutter mounted below the blank to cut the concave face on the blank, of a hollow rotating cutter in advance of the first cutter to cut the outer convex face on the blank, and a longitudinally-curved support extending through the hollow cutter to support the blank to be operated upon by the hollow cutter, the bearing-face of said support being convex in cross-section to correspond with the concave face of the blank formed by the first cutter, and having upwardly-extending side flanges, substantially as described.

14. In a machine for making bicycle mudguards, or other like articles, the combination with a rotating cutter to form the under concave face on the blank, of a hollow rotating cutter, through which the blank passes, to form the outer convex face on the blank, the rear portion of the bore of said cutter being of the same diameter as that of the circle on which the convex face is formed, and a longitudinally-curved support for the blank extending through the hollow cutter, the curvature of the support being the same as the longitudinal curvature of the article being made, substantially as described.

15. In a machine for making bicycle mudguards, or other like articles, the combination of two rotating cutters one of which is tubular, arranged to operate successively on the blank to form the concave and convex faces thereon, of a longitudinally-curved supporting-plate, feed-rolls at both ends of the machine, and gearing connecting the feed-rolls to drive them simultaneously and uniformly, substantially as described.

16. In a machine for making bicycle mudguards, or other like articles, the combination of two rotating cutters, one of which is tubular, arranged to operate successively on the blank to form the concave and convex faces thereon, of a positively-driven cylindrical feed-roll, having a roughened periphery, at the feed end of the machine, a positively-driven roll having a convex periphery at the discharge end of the machine, a roll journaled in spring-actuated bearings at each end of the machine coöperating with the feed-rolls, the one at the discharge end of the machine having a concave periphery, and a longitudinally and transversely curved support for the blank, extending through the tubular cutter, substantially as described.

17. In a machine for making bicycle mudguards, or other like articles, the combination with a work-guide and two rotating cutters arranged one in advance of the other to operate respectively on the lower and upper faces of the blank, the first cutter being supported obliquely with respect to the work-guide, and each cutter having a pulley integral therewith, of two driving-pulleys mounted side by side on a common shaft, belts connecting the driving-pulleys respectively with the pulleys on the cutters, the driving-pulley for the second cutter being in vertical alinement with its cutter-pulley, and that for the first cutter being out of vertical alinement with its cutter-pulley, and guide-pulleys to twist and guide the driving-belt of the first cutter between the driving-pulley and the cutter-pulley, substantially as described.

18. In a machine for making mud-guards or other like articles, the combination of a rotating cutter arranged below, and obliquely to, the line of feed of the work and driven in a direction transversely across the face of the blank when presented to said cutter, devices for supporting the cutter-shaft in proper relation to the blank, a longitudinally-curved work-trough supported at one end upon the cutter-supporting devices and provided with slots, through one of which protrude the knives of the cutter, a corrugated feed-roll in advance of the cutter and having corrugated fingers protruding through slots in the feed-trough, a presser-roll coacting with the feed-roll, and adjustable stop devices engaging with the forward end of the feed-trough to restrain the latter against vibration laterally to the line of feed of the work, substantially as described.

19. In a machine for making bicycle mud-guards and other like articles, the combination with a rotating cutter, and feed-rolls in advance thereof, of a longitudinally-curved trough in fixed relation to said cutter and feed-rolls, and the spring guide-plates suspended within the trough independently of the same and of its supporting devices, said suspended guide-plates arranged longitudinally of the trough and in substantially parallel relation to each other to lie on opposite sides of the work-blank and to have lateral engagement therewith, substantially as described.

20. In a machine for making bicycle mud-guards and other like articles, the combination with a rotating cutter, and feed-rolls in advance thereof, of a longitudinally-curved work-trough in operative relation to said cutter and feed-rolls, spring guide-plates arranged longitudinally within the trough and parallel to each other to engage with the side edges of the work-blank as it is fed through the trough, and devices for suspending said spring guide-plates within the trough, substantially as described.

21. In a machine for making bicycle mud-guards and other like articles, the combination with a cutter rotating in a plane transversely across the line of work-feed, of the supporting-bearings arranged obliquely to the line of feed and hung on pivotal devices which lie at right angles to the axis of the cutter-head, substantially as described.

22. In a machine for making bicycle mud-guards and other like articles, the combination with work supporting and feeding devices, of a cutter rotating in a plane transversely across the line of feed of the work, cutter-supporting devices arranged with their axes oblique to the line of feed and each supporting device hung on pivots which lie at right angles to the axis of said cutter, and bearing-blocks adjustable in the supporting devices in the direction of the axis of said cutter, said bearing-blocks receiving the cutter-journals, substantially as described.

23. In a machine for making bicycle mud-guards and other like articles, two rotating cutters arranged one in advance of the other and in different horizontal planes to operate successively and on opposite sides of the blank, the first cutter arranged in a position oblique to the line of work-feed, rotating in a plane transversely across the face of the work, and having its knives or blades disposed obliquely to the face of the work to operate thereon with a draw or shear cut, and the other cutter being tubular with its blades or knives arranged oblique to the face of the work and said cutter also rotating in a plane transversely to the line of work-feed, in combination with means for guiding the work from the first cutter to and through the tubular cutter, and positively-driven feed mechanism on opposite sides of the two cutters, substantially as described.

24. In a machine for making bicycle mud-guards and other like articles, the combination of cutters arranged in different planes to operate successively on the work and driven in planes transversely across the line of feed of the work, a set of feed-rolls in advance of one cutter, another set of feed-rolls in rear of the other cutter, a counter-shaft geared to one roll of each set of feed-rolls, and a clutch-controlled mechanism mounted on the machine-bed and operatively connected with said shaft, substantially as described.

25. In a machine for making mud-guards and analogous articles, the combination of a tubular cutter rotating in a plane transversely across the line of feed of the work and provided at one end with a head, knives or blades fixed to said head obliquely to the axis of the cutter, and a fixed longitudinally-curved work-plate extending through the tubular cutter on a line oblique to the cutter-axis and lying within the path of said knives or blades in the cutter-head, substantially as described.

In testimony that I claim the foregoing as my own I have hereto affixed my signature in the presence of two witnesses.

GEORGE L. ALLEN.

Witnesses:
W. E. BURDICK,
D. F. HART.